United States Patent [19]
Baxter

[11] 3,710,488
[45] Jan. 16, 1973

[54] MICROFICHE VIEWING DEVICE
[75] Inventor: Carlton D. Baxter, Rochester, N.Y.
[73] Assignee: Eastman Kodak Company, Rochester, N.Y.
[22] Filed: Nov. 25, 1970
[21] Appl. No.: 92,617

[52] U.S. Cl..............................40/63 A, 40/106.1
[51] Int. Cl................................................G09f 11/30
[58] Field of Search.......40/63 A, 64 A, 86 A, 106.1; 350/241, 255, 27, 29; 40/96.5, 96, 82, 83

[56] References Cited

UNITED STATES PATENTS

| | | | |
|---|---|---|---|
| 3,384,436 | 5/1968 | Kunnel | 40/68 X |
| 2,781,595 | 2/1957 | Bourdin | 40/96.5 X |
| 1,833,595 | 11/1931 | Samson et al. | 40/86 A |
| 3,180,207 | 4/1965 | Herrmann | 40/68 X |
| 3,229,396 | 1/1966 | Shaw | 40/36 A |

FOREIGN PATENTS OR APPLICATIONS

| | | | |
|---|---|---|---|
| 361,654 | 9/1906 | France | 40/96.5 |
| 525,430 | 1/1954 | Belgium | 40/86 A |

Primary Examiner—Robert W. Michell
Assistant Examiner—Richard Carter
Attorney—W. H. J. Kline, Paul R. Holmes and Lloyd F. Seebach

[57] ABSTRACT

A portable or hand-held viewer comprises an assembly of two cylinders, one of which is transparent, which are retained on the end of a support means or handle member. When a microfiche transparency is inserted between the cylinders and the transparent cylinder is rotated, the microfiche transparency is moved between the cylinders and relative to a viewing station in the end of the support means or handle member. The manner in which the two cylinders are mounted on the support means or handle member permits them to be moved as a unit in a lateral direction as well as to be moved as a unit while the transparent cylinder is rotated to move the transparency in a longitudinal direction.

11 Claims, 7 Drawing Figures

PATENTED JAN 16 1973 3,710,488

CARLTON D. BAXTER
INVENTOR.

BY *Lloyd F. Sebach*

AGENT

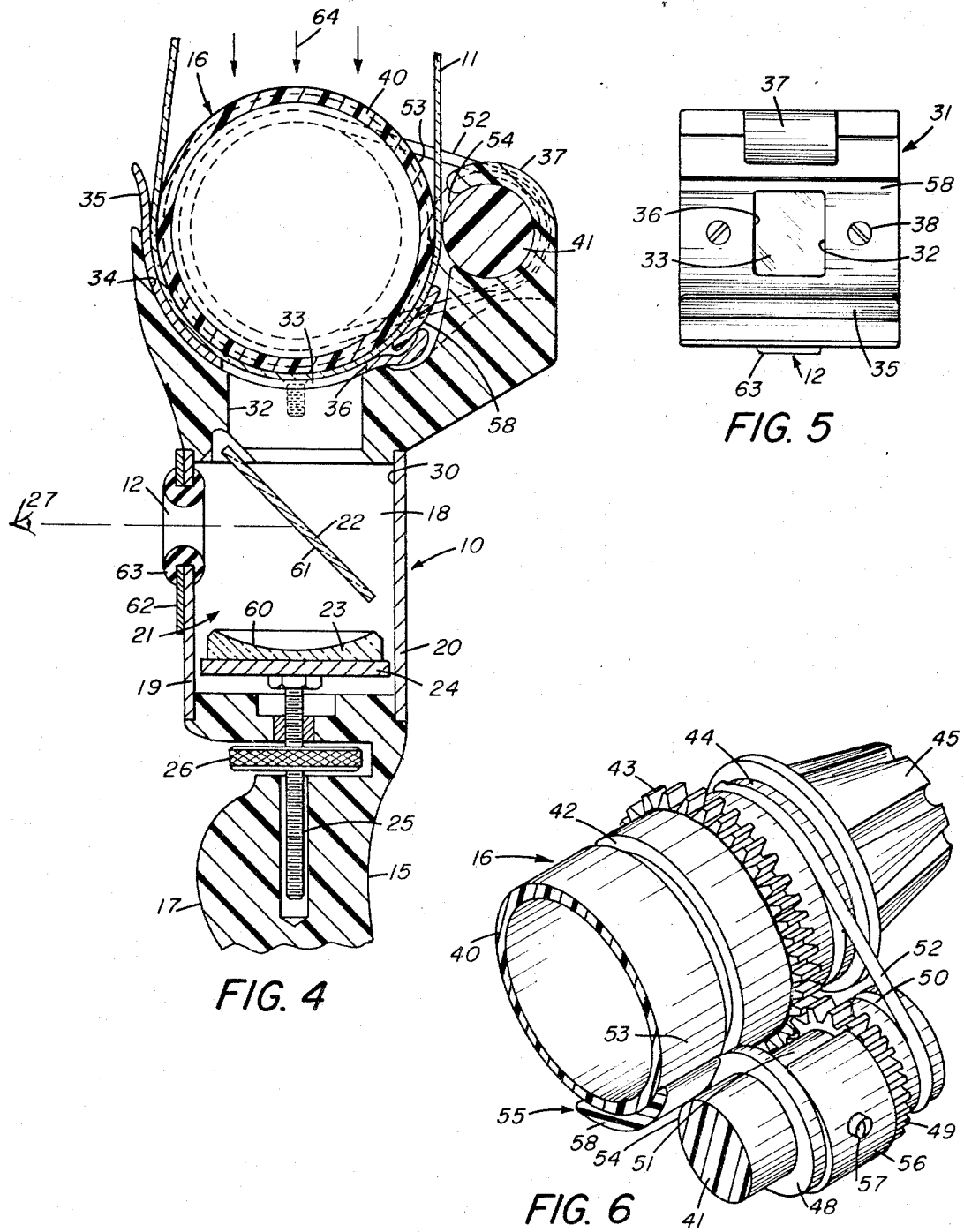

MICROFICHE VIEWING DEVICE

FIELD OF THE INVENTION

The invention relates to a device for viewing microfiche transparencies having image areas arranged thereon in X-Y coordinates. More particularly, the invention is concerned with a portable or hand-held viewer which is of such construction that a microfiche transparency can be readily moved in a longitudinal direction and/or in a lateral direction to position a selected image area in the viewing station of the device.

DESCRIPTION OF THE PRIOR ART

It is well-known in the prior art to provide a viewer or reader, which is usually of a size for setting on a table, desk or stand, for viewing either microfiche transparencies or microfiche cards with a mechanism by which the microfiche can be moved in a plane and in either the X and/or Y direction in such plane to position an image relative to the axis of an optical system. Such a mechanism is usually of a rather complex nature, and the optical system used in conjunction with the mechanism is usually such as to provide a relatively large magnification of the image. As a result, the screen on which the image is projected is relatively large, and in very few instances can such apparatus be described or referred to as being a hand-held type. A viewer for microfiche cards or transparencies that might be considered to be hand-held is usually of relatively large size because the apparatus contains an illuminating system for the image area. This, of course, requires the need for batteries or for means to connect the apparatus to a source of electrical potential in order to energize the microfiche illuminating system.

SUMMARY OF THE INVENTION

The primary object of the invention is to provide a portable or hand-held viewer for microfiche transparencies in which a desired image area can be positioned relative to a viewing station and in which ambient light is used to illuminate the selected image area.

Another object of the invention is to provide a portable or hand-held viewer for microfiche transparencies in which the transparency can be readily moved in a longitudinal and/or lateral direction to position the desired image area relative to the viewing station.

Still another object of the invention is to provide a portable or hand-held viewer for microfiche transparencies which is easy to load, small, light in weight, of simple construction and utilizes ambient light as a source of image illumination.

These and other objects of the invention will be apparent to those skilled in the art by the description which follows.

The above objects of the invention are attained by rotatably and slideably mounting a hollow, transparent cylinder relative to support means or a handle member in which a very simple optical system is contained for viewing a selected image area. The transparent cylinder cooperates with another small, drive cylinder which is interconnected to and maintained in a predetermined spacing relative to the transparent cylinder through the medium of meshing gears and retained in such relationship by means of a resilient O-ring. Since the spacing between the cylinders is less than the thickness of a microfiche transparency, the O-ring and the manner in which the cylinders are mounted permit the cylinders to move relative to one another when a transparency is inserted therebetween. The assembly of the two cylinders is retained on the end of the support means or handle member. When a microfiche transparency is inserted between the cylinders, and the transparent cylinder is rotated, the microfiche transparency is moved between the cylinders and relative to a viewing station in the end of the support means or handle member. The manner in which the two cylinders are mounted on the support means or handle member permits them to be moved as a unit in a lateral direction as well as to be moved as a unit while the transparent cylinder is rotated to move the transparency in a longitudinal direction. The drive cylinder carries a shoe or pressure member which holds the microfiche transparency against the transparent cylinder. Also, a spring or resilient member on the support means or handle member retains the cylinders in a sliding relationship with respect thereto and also serves to maintain the microfiche transparency in contact with the transparent cylinder. The relationship of the microfiche transparency and the transparent cylinder when the transparency is inserted in position between the cylinders for movement relative to the viewing station is generally of a U-shape so that ambient light can pass between the ends of the microfiche transparency and through the transparent cylinder to illuminate the image area positioned in the viewing station.

DESCRIPTION OF THE DRAWINGS

Reference is now made to the accompanying drawings in which like reference numerals designate like parts and wherein:

FIG. 4 is a vertical sectional view taken substantially along the line 4—4 in FIG. 2;

FIG. 5 is a plan view of the support means or handle member showing the position of the viewing station;

FIG. 6 is a partial perspective view of the assembly formed by the cylindrical members and showing particularly the manner in which the cylindrical members are driven and retained in an assembled relation.

DESCRIPTION OF THE PREFERRED EMBODIMENT

Figure 1:
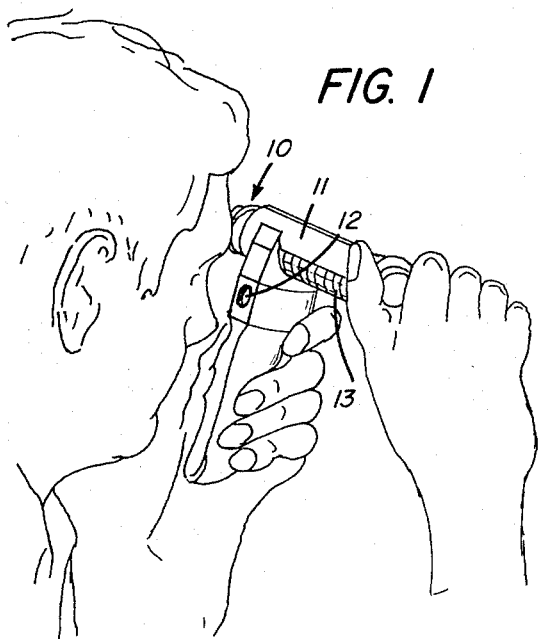
FIG. 1 is a diagrammatic view showing the manner in which the portable or hand-held viewer can be used by an operator.

With particular reference to FIG. 1, a hand-held viewer 10 in accordance with the invention is shown being held by an operator, and this view also shows the manner in which the microfiche transparency 11, when inserted in the viewer, can be moved to position a selected image area with respect to a viewing station, while being held by the operator and being viewed through the opening 12. From the description that follows, it will be evident that the viewer lends itself very readily to easy operation, as well as operation from either side, so it can be manipulated with equal ease by either a right-hand or a left-hand operator.

As is well-known, a microfiche can be a sheet of photographic film with which a light-transmittance optical system is usually used, or a sheet of photographic paper with which a light-reflectance optical system is used, both of which are provided with a plurality of image areas arranged in X-Y coordinates. The present invention lends itself particularly to microfiche transparencies in that ambient light is utilized to illuminate the image area to be viewed. As a result, a transmittance system is used to illuminate the image area being viewed rather than a reflectance system. As is well-known in this art, the microfiche transparency 11 is provided with a plurality of image areas 13 and such areas are usually arranged in accordance with X-Y coordinates so the microfiche transparency can be moved in either direction or a combination of the directions to position a particular or selected image area with respect to a viewing station. The rows of image areas extending in a direction corresponding to the long dimension (usually parallel to the heading edge) of a transparency are said to extend in the X coordinates or laterally of the transparency. On the other hand, the rows of images extending in a direction corresponding to the short dimension of a transparency are said to extend in the Y coordinate or longitudinally of the transparency.

The viewer 10 comprises support means or handle member 15 and a microfiche translating means or assembly 16 which is mounted on an end of the handle member, see FIG. 4. Support means or handle member 15 can be as shown, can be a post which fits into a suitable receptacle carried by a frame or cap which fits on the head, or can be integral with such a frame or cap so both hands of the viewer are free. In the embodiment of the invention about to be described, the support means comprises handle member 15 having a hand grip 17, and recess 18 at one end, which can be formed in the handle member 15 per se or formed, for example, by members such as U-shaped plates 19 and 20 that are spaced and fixed to the end of the handle member 15 in any suitable manner. The recess 18 contains a viewing system 21 which comprises a transmittance-reflectance mirror 22 and a spherical reflecting mirror 23 which is mounted on a plate 24 movable with respect to mirror 22 by means of a threaded extension 25 and a rotatable thumb nut 26. The viewing opening 12 is optically aligned with the mirror 22, and the focal point of mirror 23 is generally at a position designated by 27 in which the operator's eye will normally be positioned. Accordingly upon rotation of the nut 26, the spherical mirror 23 will be moved vertically and axially, as seen in FIG. 4, and its focal point will be moved relative to point 27.

The open end 30 of recess 18 is enclosed by a yoke or support member 31 having a rectangular aperture 32 which forms the viewing station 33, and is optically aligned with the mirrors 22 and 23, see FIGS. 4 and 5. The yoke member 31 is secured in position by screws 38 and is provided with an arcuate portion 34 in which a resilient member 35 having an aperture 36 is mounted, the aperture 36 being aligned with the aperture 32 in the yoke member 31. The yoke member 31 is also provided with a generally hook-shaped portion 37, the purpose of which will be described hereinbelow.

The translating means or assembly 16 mounted on and movable relative to yoke member 31 on the end of handle member 15 and by which the microfiche transparency 11 is moved relative to the viewing station 33 in an X and/or Y direction comprises a hollow, transparent, cylindrical member 40 and a cylindrical member 41. These members are assembled, as described hereinafter, to be moved as a unit in a lateral direction or relative to one another to move the microfiche transparency therebetween in a longitudinal direction so as to position a selected image area relative to viewing station 33. Member 40 is provided at each end with a groove 42, a gear 43, a pulley 44, and an operating knob 45, see FIG. 2. Structurally, the gear 43 and pulley 44 can be formed intergal with one another as well as with an extension for insertion into the end of member 40 and a spindle or shaft on which the knob 45 can be fixed. Obviously, this design can be varied in a number of different ways. The cylindrical member 41 comprises a collar 48 formed on each end thereof and in such a relation that it will engage the corresponding groove 42 in the transparent, cylindrical member 40. Also, the cylindrical member 41 carries on each end thereof a gear 49 and a pulley 50. Between each collar 48 and gear 49 a freely rotatable sleeve 51 is mounted. With respect to FIGS. 4 and 6, it will be noted that gears 43 and 49 intermesh, and a resilient member 52, such as an O-ring, interconnects the pulleys 44 and 50 on each end of the assembly. With this construction the resilient members 52 hold the members 40 and 41 together with the gears 43 and 49 in engaging relationship, the spacing between the peripheral surfaces 53 and 54 of members 40 and 41, respectively, being less than the thickness of a microfiche transparency. However, when a transparency is inserted between members 40 and 41, resilient member 52 allows the necessary separation to take place. The engagement of the collars 48 with the grooves 42 permits the unit 16 to be moved in a lateral direction by sliding without one of members 40 and 41 moving relative to the other, such engagement also being maintained by resilient member 52.

Figure 7:
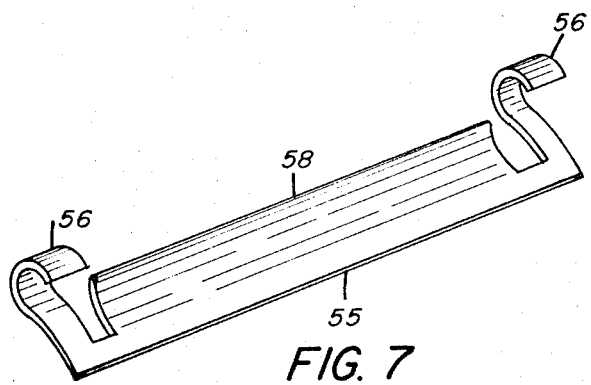
FIG. 7 is a detail perspective view of the guide or shoe member for maintaining the microfiche transparency in contact with the transparent cylindrical member.

With reference to FIG. 4, it will be noted that the microfiche transparency 11 is arranged between the cylindrical members 40 and 41. A hold down shoe 55, see FIGS. 6 and 7, has hook portions 56 at each end which are fixed by screws 57 to a respective sleeve 51 on cylindrical member 41. The lateral portion 58 of the shoe 55 between hook portions 56 is arcuate in shape, and is urged toward member 40 and against the microfiche transparency 11 by the end 59 of resilient member 35, as shown in FIG. 4. The microfiche transparency 11 is also maintained against the cylindrical member 40 on the other side of the viewing station 33 by the resilient member 35. In addition, the microfiche transparency is clamped by the cylindrical members 40 and 41 so long as it is therebetween.

The cylindrical members 40 and 41 with their constituent parts form the translating means or assembly 16 only a portion of which is shown in FIG. 6. This assembly can be readily mounted on the handle member 15 by inserting the central portion of cylindrical member 41 in engagement with the hook portion 37 of yoke member 31. Upon pivoting the assembly 16 toward the viewing station 33, the cylindrical member 40 will be engaged by the resilient member 35 and the entire assembly will be urged toward the hook portion 37 to retain the assembly on the handle member 15. A microfiche transparency 11 can then be inserted between cylindrical members 40 and 41 with the heading edge of the transparency being first inserted. On turning either of the knobs 45 in the proper direction, the transparency 11 will be moved around the cylindrical member 40 and toward the viewing station 33. With this movement, each of the image areas formed in a longitudinal row on the transparency (Y direction) can be moved relative to the viewing station 33. On the other hand, if the assembly 16 is to be moved in a lateral direction (X direction), one of the knobs 45 is used to merely slide the complete assembly 16 to the right or left with respect to the handle member 15 until the desired image area is positioned relative to the viewing station 33. It is understood, of course, that this movement of the microfiche transparency 11 is taking place while the operator is sighting through the viewing opening 12. Inasmuch as the microfiche transparency 11 does not completely cover the peripheral surface of the transparent cylindrical member 40, ambient light incident on the member 40 (as indicated by arrows 64) passes therethrough and through the image area in the viewing station 33. The image is transmitted through the mirror 22 and is reflected from the surface 60 of mirror 23 back to surface 61 of mirror 22 and through viewing opening 12 to the eye of the operator. As mentioned hereinabove, the nut 26 can be rotated to focus the image in accordance with the operator's requirement.

Figure 3:
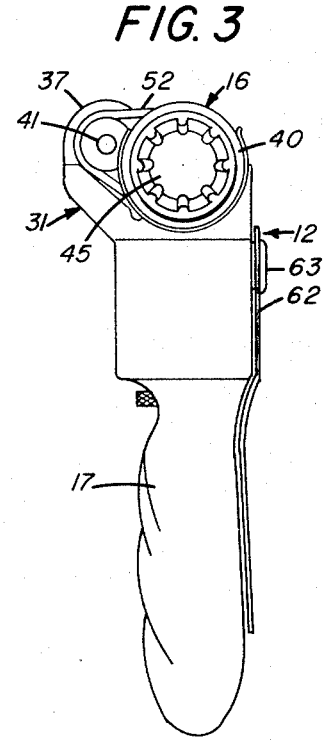
FIG. 3 is a side elevational view of the viewer shown in FIG. 2.
Figure 2:
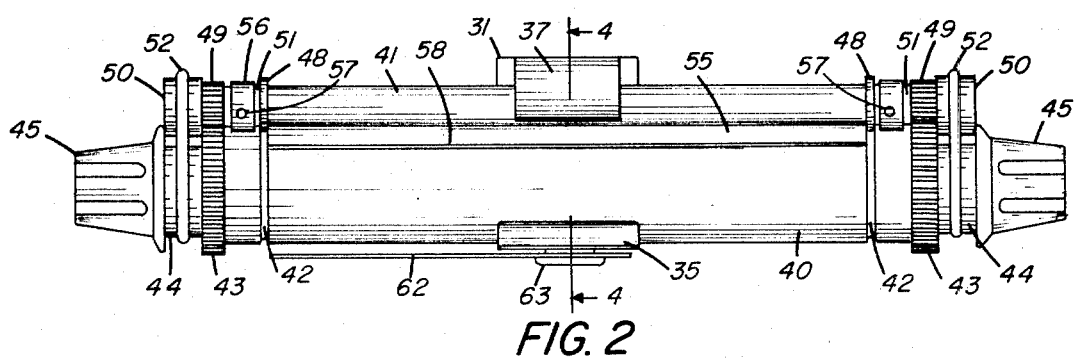
FIG. 2 is a plan view of a hand-held viewer in accordance with the invention.

The cylindrical member 40 can be made of glass or a suitable transparent plastic material and can be either a solid or hollow cylinder. Also, the cylindrical member 41 can be of a plastic material, and in order to obtain the required degree of friction between the microfiche transparency 11 and the peripheral surfaces of the cylindrical members 40 and 41 for moving the microfiche transparency, the surfaces of these members (40, 41) can be coated with a material having a high degree of friction or at least higher than that of the glass or plastic material. Such a friction material can be a type of either transparent or translucent rubber which is coated on at least the peripheral surface of member 40 and, if necessary, also on member 41. As shown in FIGS. 2, 3, and 4, a swing-out opaque mask 62 which blocks the operator's eye not being used to view the image can be pivotably mounted with respect to the viewing opening 12 by means of a grommet 63. The top and bottom edges of the mask 62 can be notched to provide clearance for the operator's nose, so it can be moved to the right or left depending on which eye the operator places relative to the viewing station 12.

The invention has been described in detail with particular reference to preferred embodiments thereof, but it will be understood that variations and modifications can be effected within the spirit and scope of the invention.

I claim:

1. A device for viewing a microfiche transparency having discrete image areas arranged thereon in X-Y coordinates, comprising:

support means having a viewing station, a viewing system carried by said support means and arranged in optically aligned relationship to said viewing station, and a yoke member arranged relative to said viewing station;

translating means comprising a first, transparent, cylindrical member and a second cylindrical member for retaining said transparency in contact with first cylindrical member, said first and second cylindrical members being slidably and rotatably mounted in said yoke member for moving said transparency relative to said viewing station so as to position a selected one of said image areas in said viewing station wherein the selected one of said image areas is illuminated by the ambient light transmitted through said first cylindrical member; and operating means associated with one of said first and second cylindrical members for moving the latter as a unit in an axial direction and for rotating the same relative to each other to position the selected one of said image areas in said viewing station.

2. A viewing device in accordance with claim 1 including means for maintaining said first and second cylindrical members in a spatial relationship while being moved as a unit in an axial direction and rotated relative to each other.

3. A viewing device in accordance with claim 2 wherein said spatial maintaining means comprises an annular groove adjacent at least one end of one of said first and second cylindrical members and a collar adjacent at least the same one end of the other of said first and second cylindrical members and engaging said groove.

4. A viewing device in accordance with claim 1 wherein said first cylindrical member is hollow, and said operating means includes an operating member fixed to at least one end of said first cylindrical member for manually rotating the latter and/or moving said first and second cylindrical members in said axial direction.

5. A viewing device in accordance with claim 1 including resilient means carried by said yoke member for maintaining said microfiche in contact with said first cylindrical member; and coupling means comprising a drive member on each end of said first cylindrical member, a driven member on each end of said second cylindrical member, and a resilient member positioned adjacent the drive and driven members at each end of said first and second cylindrical members for maintaining the latter and said drive and driven members in an operating relationship.

6. A viewing device in accordance with claim 5 wherein said drive members and said driven members comprise, respectively, a gear mounted adjacent each end of said first cylindrical member and a pinion mounted adjacent each end of said second cylindrical member and engaging a respective one of said gears.

7. A viewing device in accordance with claim 1 wherein said yoke member comprises an arcuate resilient member arranged to peripherally engage a portion of said first cylindrical member for retaining the same and a generally arcuate extension arranged to peripherally engage a portion of said second cylindrical member for retaining the same in relation to said first cylindrical member.

8. A viewing device in accordance with claim 1 wherein said support means comprises a handle and wherein the axes of said first and second cylindrical members are generally parallel to one another and generally perpendicular to the axis of said handle member, the axis of said first cylindrical member being generally coplanar with the axis of said handle member.

9. A viewing device in accordance with claim 1 wherein a selected one of said image areas is moved into said viewing station between said first cylindrical member and said yoke member and the selected one of said image areas is illuminated by the ambient light incident on and transmitted by said first cylindrical member.

10. A viewing device in accordance with claim 1 wherein said support means comprises a handle member having an open-end recess in one end thereof and said viewing system comprises an opening in said yoke member, a spherical mirror mounted in said recess, a light reflecting-transmitting member mounted in said recess intermediate said opening and said spherical mirror, and a viewing aperture in said handle member and optically aligned with said reflecting-transmitting member.

11. A viewing device in accordance with claim 10 including manually operative means coupled to said spherical mirror for moving the latter in an axial direction to focus an image area positioned relative to said viewing station in said viewing aperture.

* * * * *